| United States Patent [19] | [11] 3,875,133 |
| Balducci et al. | [45] Apr. 1, 1975 |

[54] CATALYST COMPOSITION USEFUL FOR THE DIENE POLYMERIZATION AND POLYMERIZATION PROCESS USING THE ABOVE CATALYST SYSTEM

[75] Inventors: Agostino Balducci; Alessandro Beranger, both of San Danato Milanese; Margherita Corbellini, Milan, all of Italy

[73] Assignee: Snam Progetti S.p.A., San Danato Milanese, Italy

[22] Filed: Aug. 3, 1972

[21] Appl. No.: 277,512

Related U.S. Application Data

[62] Division of Ser. No. 108,740, Jan. 22, 1972.

[30] Foreign Application Priority Data
Jan. 22, 1970  Italy .................................. 19652/70

[52] U.S. Cl............ 260/94.3, 260/94.6, 252/429 A

[51] Int. Cl. .............................. C08d 1/4, C08d 3/2
[58] Field of Search .................................... 260/94.3

[56] References Cited
UNITED STATES PATENTS

| 3,245,976 | 4/1966 | Marconi et al. .................... 260/94.3 |
| 3,468,867 | 9/1969 | Marconi et al. .................... 260/94.3 |
| 3,476,734 | 11/1969 | Marconi............................. 260/94.3 |

FOREIGN PATENTS OR APPLICATIONS

| 6,515,838 | 12/1965 | Netherlands...................... 260/94.3 |

*Primary Examiner*—William F. Hamrock

[57] ABSTRACT

A process for the stercospecific polymerization of conjugated diene by polymerizing in the presence of a catalyst comprising a compound of a transition metal of titanium vanadium zirconium, cobolt, manganese and nickel and a polyiminic polymer.

3 Claims, No Drawings

CATALYST COMPOSITION USEFUL FOR THE DIENE POLYMERIZATION AND POLYMERIZATION PROCESS USING THE ABOVE CATALYST SYSTEM

This is a division, of application Ser. No. 108,740, filed Jan. 22, 1972.

The present invention refers to a new improved catalyst system to be employed in the stereospecific polymerization of conjugated dienes and the polymerization process using the above catalyst system.

It is known to prepare polydienes at high structure regularity employing catalyst systems comprising transition metal compounds and aluminum alkyls. It is particularly possible to prepare for instance 1,4 cis polyisoprene using catalyst system comprising $TiCl_4$ and trialkyl aluminum. With the same catalyst system it is also possible to obtain 1,4 trans polyisoprene by varying the composition of the catalyst system components.

The above catalyst systems because of the presence of aluminum alkyls, present the drawback of the instability characteristic of the organometallic compounds which are easily attacked by the moisture, the oxygen and so on. On the other hand it has to be pointed out that the polyisoprene obtained in such a way hardly present high $\eta$ values and consequently high molecular weight and requires in any case a separation of the low molecular weight polymer which are not employed in the tire industry.

It has also been found that it is possible to obtain stereospecific polymers starting from conjugated dienes comprising at least 4 carbon atoms in the molecule by employing a catalyst system including besides the transition metal compound a polymeric compound of aluminum of the polymeric type which contains in its molecule the following repeated units:

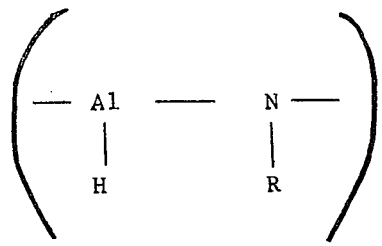

wherein R represents an alkyl, aryl or cycloalkyl radical. Said compounds may be easily prepared by reacting $LiAlH_4$ with the amine hydroxychlorides or by reacting $AlH_3$ with primary amines:

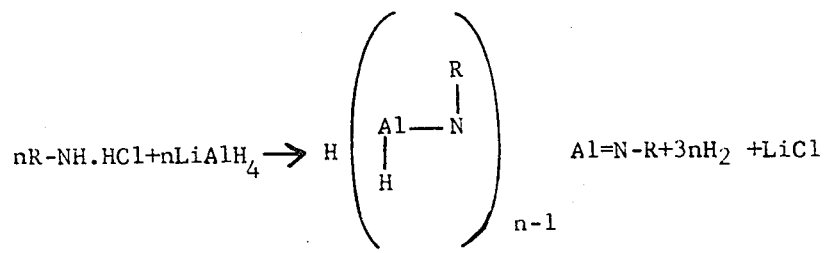

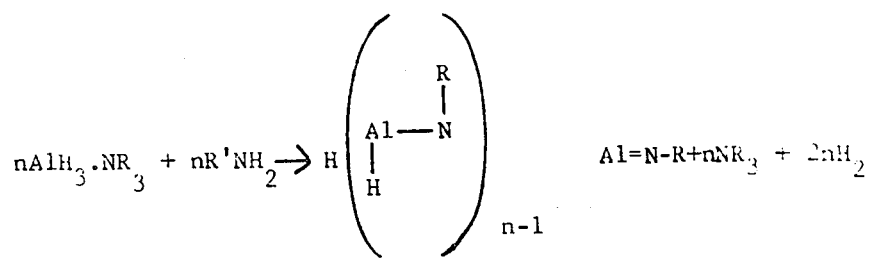

wherein R and R' which are equal or different are selected among aryl, alkyl or cycloalkyl radicals as for instance: $CH_3$, $C_2H_5$, $nC_4H_9$, $C_6H_5$. Said compounds shall be defined in the following as imine polymers of aluminum. Said preparations have been reported by E. Wiberg, A. May in Z Naturforsch, 106, 232 (1955) and particularly by Herlich et al in Inorg. Chem. 3, 628 (1964). The molecular weight measurements show n< 2. When n is small (about 2 to 50) said compounds are soluble in the aromatic solvents and in some aliphatic ones. The higher molecular weight polymers are insoluble in the conventional solvents, also if they are effective as catalysts in the presence for instance of $TiCl_4$ since they contain an equivalent of active hydrogen for each aluminum atom. We have now found that the best results can be achieved when in the above-mentioned aluminum compound of the polymeric type beside the above-defined polymer components, i.e. aluminum, nitrogen, hydrogen and hydrocarbon radicals bound to nitrogen, some chlorine, directly bound to the aluminum atom is also present. Therefore the aluminum compound according to the invention corresponds to the formula:

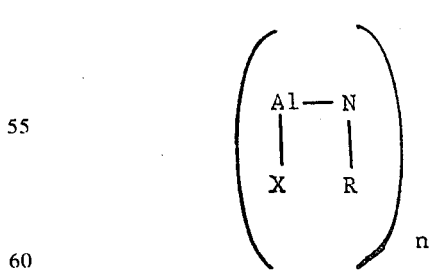

wherein R is a hydrocarbon radical selected among alkyl, aryl and cycloalkyl radicals, X may be hydrogen or halogen, the number of the halogen atoms being in any case lower than n and the balance to n being constituted by hydrogen atoms, n being selected in the range 2 to 50 preferably 3 to 12. The halogen is introduced by suitably operating with a halogenating agent in the stage of the synthesis of the polyimine alone.

More particularly it has been found that the catalyst composition of the present invention allow to obtain many advantages when suitable values of the Cl/Al ratio are used.

When the Cl/Al ratio attains the values foreseen by the present invention it has been surprisingly observed that the polymerization rate of the diolefin (the other conditions remaining the same) is higher than the one obtainable with the polymers of the same kind (aluminum compounds of the polyiminic type) without chlorine or with an insufficient amount thereof. This feature favorably affects the process economy in that for obtaining in a given period of time a fixed conversion, less catalyst is required.

Another advantage of the invention is offered by the possibility, deriving from the increased activity of the catalyst according to the present invention, of polymerizing the diolefin at lower temperature or at higher dilution, which favorably influences the Mooney viscosity of the polymer by increasing its value.

Other advantages inherent to the use of the partially chlorinated polyiminoalane are the following:

1. The chlorine in the polymer chain of the polyiminoalane serves as molecular weight regulating agent of the polyimino-alane; in fact using a controlled excess of $AlCl_3$ as halogenating agent in the polyiminoalane synthesis, polyimino-alane having a controlled number of aluminum atoms comprised between 3 and 6 are obtained independently from the reaction time and this provides a remarkable advantage both in the catalyst yield and in the storing (stability of the composition of the polyiminoalane with the time).

2. With the chlorinated polyiminoalanes, besides obtaining rates higher than the ones without chlorine, there is also the advantage that the best T/Ti ratio range for the polymerization is much wider than with the polyiminoalanes without chlorine; the courses reported on the diagram of FIG. 1 are obtained thereby wherein the curves a) refer to unchlorinated polyiminoalanes and the curves b) refer to chlorinated polyiminoalanes. The curves are obtained by plotting the H/Ti ratio on abscissae versus the conversion as grams of polymer for 100 grams of fed monomer, on ordinates the duration time, the temperature and the concentrations being the same.

The preparation of the aluminum compound useful as catalyst according to the invention may be carried out according to many different methods. Among these methods the following are proposed:

a. Reaction between LiH or NaH and $AlCl_3$ using less alkali hydride than the amount required by the stoichiometry (2 moles of LiH + 1 mole of $AlCl_3$) to form $AlH_3$: $(3-x) LiH + AlCl_3 \rightarrow AlH_{3-x}Cl_x + (3-x)LiCl$; wherein x is a number comprised between 0 and 1 followed by the addition of a primary amine:

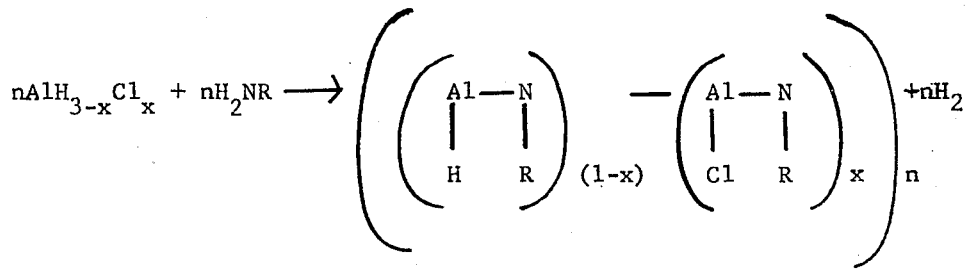

b. Contacting an unchlorinated polyiminoalane with the desired amount of gaseous HCl:

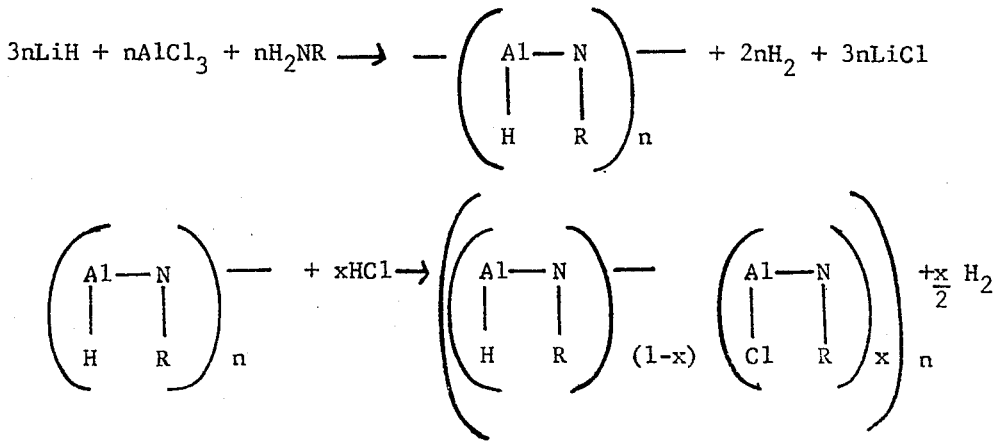

c. Contacting an unchlorinated polyiminoalane with such an amount of $AlCl_3$ to obtain the sought Cl/Al ration.

The aluminum chloride reacts as aluminum chlorohydride on the terminal — NHR after having exchanged chlorine with the hydrogen of the polyiminoalane.

d. Contacting an unchlorinated polyiminoalane with $Cl_2AlNHR$:

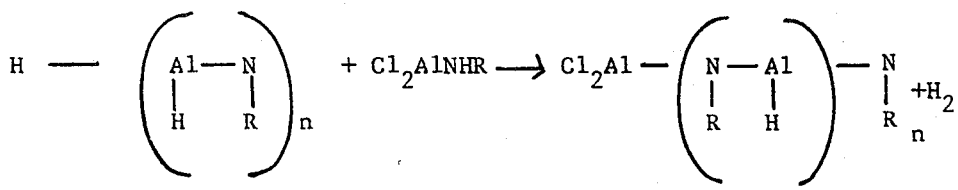

With such a chlorination the chlorine goes only to the terminals of the polymer, but the results in the isoprene polymerization do not change with respect to a polyiminoalane with a statistical disposition of the chlorine when prepared according to a).

It is evident that the preferred reaction is the first one since a remarkable saving in LiH (or NaH) which is an expensive compound.

More particularly the preparation of the aluminum compound useful as catalyst according to the present invention, is carried out starting from LiH (or NaH) and AlCl$_3$ and a primary amine by metering the amount of LiH (or NaH) in such a way to attain suitable Cl/Al values.

The aluminum compound according to the invention is characterized, as aforesaid, by the presence of chlorine which partially substitutes the hydrogen atoms bound to aluminum; under a particular aspect it is preferable that the Cl/Al ratio is comprised between 0.02 and 0.6 expressed as gram-atom ratio.

When aluminum compounds are employed wherein said ratio is lower than 0.02, the aforementioned advantages are no more obtained; for higher values (i.e., higher than 0.6) the amount of catalyst to be employed increases at constant yield. The aluminum compounds useful as catalyst, that is to say the chlorine containing polyiminoalane, are soluble in hydrocarbon solvents.

Without entering the reaction mechanism of the said compounds, it is very surprising and unexpected that they have an activity caused by the presence of chlorine greater than the one of the catalysts of the same kind having no chlorine. Therefore the aluminum compounds according to the present invention show both unexpected advantages with respect to the ones of the same kind without chlorine before cited about the polymerization process and the advantages of a stability greater than the one of the aluminum alkyl compounds. As an example, the polymerization of isoprene is described, which polymerization being carried out both by means of the catalyst according to the present application and by means of the one substantially without chlorine.

Obviously the invention has not at all to be understood as limited to the described example; all the possible changes can be employed by the skilled in the art without going out of the invention field.

The use of the aforesaid catalyst systems particularly allows high amounts of 1,4 cis polyisoprene to be obtained starting from isoprene. Moreover, by working at suitable conditions, it is possible to obtain 1,4 cis polyisoprene, which may reach Mooney values higher than 50 and intrinsic viscosity values higher than 5.

Said polyisoprene shows very high mechanical properties of the cured products. The transition metal compound, forming the catalyst system with the iminic polymer, may be selected among the tetrachloride, tetraiodide and tetrabromide of titanium, vanadium, trichloride, zirconium tetrachloride, cobalt chloride, cobalt acetylacetonate, manganese chloride, nickel chloride and the like. If 1,4 cis polyisoprene is wanted, it is necessary that the ratio between gram atoms of the aluminum polyiminoalane derivative and gram atoms of the transition metal is in the range of 1.01 + 5.

The reaction may be carried out, as aforesaid, in presence of inert hydrocarbon solvents as aromatic, aliphatic, cycloaliphatic hydrocarbons and their mixtures. The catalyst system of the present invention may be performed either by reacting the aluminum iminic polymer with the transition metal compound or may be formed in situ by reacting the two catalyst system components in presence of the polymerizable monomer. The advantageously usable monomers are the conjugated dienes having up to 12 carbon atoms in their molecule; among them it is possible to use, for instance, butadiene, isoprene, 1,3 pentadiene, 1,3 hexadiene, dimethyl-butadiene, phenyl-butadiene and the like.

The reaction may be carried out at temperatures ranging from $-50°$ to $100°C$ and at pressures ranging from the atmospheric one and 50 atmospheres. The invention is now illustrated by the following unrestrictive examples:

EXAMPLE 1

2050 cc. of anhydrous n-hexane were introduced into a 5 liter glass reactor, provided with a cooling jacket, two dripping funnels, a stirrer kept at a speed of 70 turns per minute; then 28.3 millimoles of TiCl$_4$, 38.5 millimoles of poly (N-isopropyliminoalane) without chlorine (the analysis of the hexane solution of the polyiminoalane showed Al = 5.17 g/100 cc; N = 2.71 g/100 cc., active hydrogen = 41.36 cc./cc., from which N/Al = 1 and H/Al = 0.95), and 900 cc. of isoprene were introduced into the reactor. Therefore the total catalyst is 1.5 percent b.w. with respect to the monomer and the isoprene amount is 30 percent b.w. with respect to the monomer-solvent mixture. The reactor is kept at 30°C. for all the reaction time.

By means of a siphon and under nitrogen pressure, shares of the reaction mixture were withdrawn at time breaks. They were weighed, dried, and the remained polymer was kept under vacuum up to constant weight. The total conversion was calculated by the weight of the withdrawn polymer. At the end of the test all the remaining reaction mixture was poured into methyl alcohol and the coagulated polymer was dried in a stove under vacuum at 40°C. A portion of the said polymer was purified by dissolving it into benzene and then by reprecipitating it by adding methyl alcohol. Then the Mooney viscosity and the 1,4 cis amount were determined.

Results:

| Yield % by solid polymer | Time, h. |
|---|---|
| 37.5 | 1 |
| 46 | 2 |
| 50.6 | 3 |
| 62 | 6 |

I.R. analysis: 1,4 cis amount = 96%; trans % = 0%; (3,4) = 4%; Total unsaturation = 98%. Mooney viscosity = 25.

EXAMPLE 2

By working according to Example 1, isoprene was polymerized by means of a catalyst consisting of chlorinated polyiminoalane and TiCl₄.

a. Preparation of the catalyst

The employed catalyst was obtained according to the following way: 675 g. of AlCl₃ in ethyl ether were added to 104 g. of LiH suspensed into one liter of anhydrous and airless ether. At the end of the adding, it was heated up to boiling for about 6 h, then cooled to room temperature and added by 1,4 liters of a hexane solution of isopropylamine (3.29 M). The adding having been ended it was heated at 40°C. for 20 hours, then concentrated by distillation and the ethyl ether was replaced by the hexane.

At the analysis it was: Al = 4.53 g/100 cc., active H = 39.4 Ncc./cc., N= 2.23 g/100 cc., Cl = 2.34 g/100 cc. to which the following gram atom ratios were corresponding: N/Al = 0.95, active H/Al = 1.05; Cl/Al = 0.39.

b) The polymerization recipe was the following ones:
anhydrous n-hexane 2050 cc.
TiCl₄ 10.7 mmoles
polyiminoalane 18.2 mmoles
isoprene 500 cc.
polymerization temperature 30°C.

As it is possible to see, the catalyst amount of this example was lower than the preceding one (1 percent b.w. with respect to the monomer) and the polymerization was carried out in a more diluted solution (20 percent b.w. of the monomer with respect to the monomer + solvent mixture).

Results:

| Yield % in solid polymer | Time, h |
|---|---|
| 48 | 1 |
| 62 | 2 |
| 68 | 3 |

I.R. analysis: 1,4 cis 96.5%; 1.4 trans 0%; (3,4) 2.5%; total unsaturation 97%. Mooney viscosity 70.

What we claim is:

1. A process for the stereospecific polymerization of isoprene which comprises polymerizing isoprene in a hydrocarbon reaction medium in the presence of a catalyst system which comprises a compound of titanium tetrachloride and a chlorinated polyiminoalane polymer of the formula

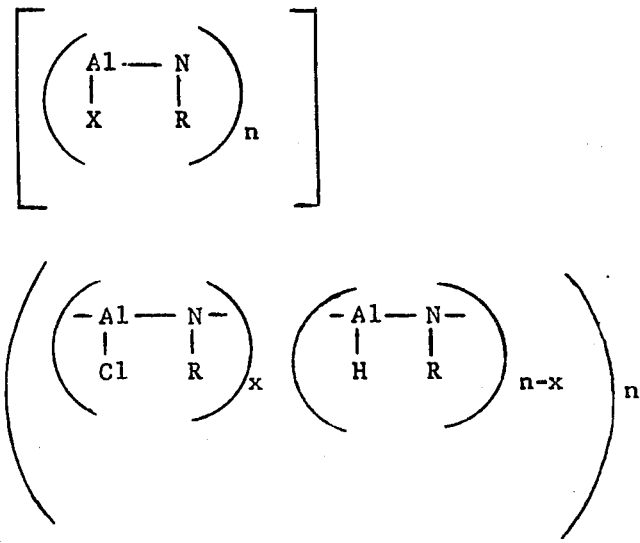

wherein R is a hydrocarbon radical selected from the group consisting of alkyl, aryl and cycloalkyl radicals; x represents the total number of polyiminoalane units having a chlorine atom; n is a number between 2 and 50, the gram atom ratio of aluminum to transition metal is between 1.0 and 5 and the gram atom ratio of chlorine to aluminum being between 0.02 and 0.6.

2. A process according to claim 1 in which the reaction is carried out in presence of an aromatic hydrocarbon, aliphatic hydrocarbon, cycloaliphatic hydrocarbon or a mixture of said solvents.

3. A process according to claim 1 in which the polymerization reaction is carried out at a temperature ranging from −50° to +100°C and at a pressure ranging from 1 to 50 atmospheres.

* * * * *

UNITED STATES PATENT OFFICE
CERTIFICATE OF CORRECTION

PATENT NO. : 3,875,133
DATED : April 1, 1975
INVENTOR(S) : Agostino Balducci, Alessandro Beranger and Marghertia Corbellini It is certified that error appears in the above-identified patent and that said Letters Patent are hereby corrected as shown below:

Claim 1, Column 8, delete

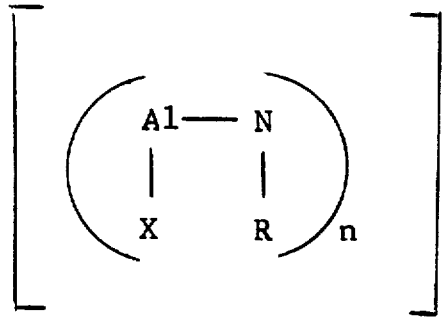

from the formula.

Signed and Sealed this twenty-ninth Day of July 1975

[SEAL]

Attest:

RUTH C. MASON
Attesting Officer

C. MARSHALL DANN
Commissioner of Patents and Trademarks